US006977357B2

(12) United States Patent
Hsu et al.

(10) Patent No.: US 6,977,357 B2
(45) Date of Patent: Dec. 20, 2005

(54) WELDING WIRE POSITIONING SYSTEM

(75) Inventors: Christopher Hsu, Mentor, OH (US); Elliott K. Stava, Sagamore Hills, OH (US); Jeffrey R. Klein, Mentor, OH (US); David J. Barton, Twinsburg, OH (US); George D. Blankenship, Chardon, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 167 days.

(21) Appl. No.: 10/616,397

(22) Filed: Jul. 9, 2003

(65) Prior Publication Data

US 2005/0006363 A1    Jan. 13, 2005

(51) Int. Cl.$^7$ ............................................. B23K 9/095
(52) U.S. Cl. ................................................ 219/130.01
(58) Field of Search ....................... 219/130.01, 130.21; 250/559.24

(56) References Cited

U.S. PATENT DOCUMENTS

| | | |
|---|---|---|
| 2,457,094 A | 12/1948 | Smith |
| 2,849,195 A | 8/1958 | Richardson et al. |
| 2,895,210 A | 7/1959 | Hubbard |
| 2,966,258 A | 12/1960 | Krafft et al. |
| 3,013,742 A | 12/1961 | Bittman |
| 3,076,619 A | 2/1963 | Nye et al. |
| 3,082,868 A | 3/1963 | Hubbard |
| 3,113,745 A | 12/1963 | Bittman |
| 3,168,259 A | 2/1965 | Cady |
| 4,296,304 A | 10/1981 | Defourny |
| 4,350,311 A | 9/1982 | Pokhodnya et al. |
| 4,508,291 A | 4/1985 | Kosch |
| 4,553,707 A | 11/1985 | Henrich |
| 4,737,614 A | 4/1988 | Richardson |
| 4,869,367 A | 9/1989 | Kawasaki et al. |
| 4,869,438 A | 9/1989 | Braun et al. |
| 4,920,249 A | 4/1990 | McLaughlin et al. |
| 5,105,943 A | 4/1992 | Lesko et al. |
| 5,277,314 A | 1/1994 | Cooper et al. |
| 5,405,075 A | 4/1995 | Narita et al. |
| 5,494,160 A | 2/1996 | Gelmetti |
| 5,558,785 A | 9/1996 | Killian et al. |
| 5,746,380 A | 5/1998 | Chung |
| 5,758,834 A | 6/1998 | Dragoo et al. |
| 5,897,071 A | 4/1999 | Hauck et al. |
| 5,932,123 A * | 8/1999 | Marhofer et al. ...... 219/130.01 |
| 6,019,303 A | 2/2000 | Cooper |
| 6,091,048 A * | 7/2000 | Lanouette et al. ..... 219/130.21 |
| 6,260,781 B1 | 7/2001 | Cooper |
| 6,270,781 B1 | 8/2001 | Gehlsen |
| 6,274,840 B1 | 8/2001 | Kanjo |
| 6,386,364 B2 | 5/2002 | Kawasaki et al. |

(Continued)

FOREIGN PATENT DOCUMENTS

DE    19754857    7/1998

(Continued)

*Primary Examiner*—Clifford C. Shaw
(74) *Attorney, Agent, or Firm*—Fay Sharpe Fagan Minnich & McKee; Brian E. Turung; Robert V. Vickers

(57) ABSTRACT

An electrode position detection system for a welder having a laser that is projected in a lateral plane to laterally cross a welding wire at a location below a contact tip of a welding gun and a receiver that receive the laser bean after crossing the welding wire, and a measuring device that determines one or more parameter of the welding wire based on the received laser beam. Arc voltage measurements can also be used to determine one or more parameter of the welding wire.

47 Claims, 7 Drawing Sheets

U.S. PATENT DOCUMENTS 6,481,575 B2   11/2002   Cipriani
2003/0235231 A1   12/2003   Rincon et al.

FOREIGN PATENT DOCUMENTS

| EP | 1 267 143 A1 | 12/2002 |
| EP | 1267143 A1 | 12/2002 |
| GB | 759.575 | 8/1954 |
| GB | 880.502 | 7/1959 |
| JP | 7-198346 A * | 8/1995 |
| WO | WO 01/88472 A1 | 11/2001 |

* cited by examiner

Wire Placement

All Area mm$^2$: 4.235, 70%: 2.214
Center mm: [-.051, -.419], Polar [.422, -97]
Brand X -600 lb on the reel Wire Placement All Area mm$^2$: 6.345, 70%: 5.63
Center mm: [.667, .00], Polar [.667, 0]
Brand Y Product-180 lb on the reel

Wire Placement

All Area mm$^2$: .301, 70%: .269
Center mm: [-.821, -.105], Polar [.828, -172.7]
Brand Z-180 lb in the box

WELDING WIRE POSITIONING SYSTEM

This invention relates generally to arc welding and more particularly to a consumable electrode position detection system and method thereof for arc welders.

BACKGROUND OF INVENTION

Arc welding systems are currently used with robotic welding systems. The use of such robotic welding systems is typically to improve welding uniformity and reproducibility, and to increase the productivity and reduce the cost of welding. It is common that the robotic welder is responsible for carrying out, handling and/or manipulating the welding gun during a welding process. Some robotic systems have been developed which are preprogrammed to perform a fix sequence of motion and process actions. In such a system, the robotic welder merely repeats sequence of motions and processes for each weld. For such a robotic welder to operate efficiency, both the welding equipment and the workpiece must be precisely positioned with reliable repetition since any deviation in the welding equipment and/or position of the workpiece or the path of the joint to be welded will be result in an inferior weld.

Several robotic arc welding system has been developed to detect the area to be weld and to adjust the welding parameters and position of the robotic welder so as to apply a weld in a proper location. Many of these robotic welding systems include a vision system utilizing optical detection to detect weld and joint position and dimensional parameters of the workpiece. Such vision-guided systems assume that wire cast out of the contact tip does not vary in production. Examples of such welding systems are disclosed in U.S. Pat. Nos. 6,274,840; 5,558,785; 5,405,075; 4,920,249; 4,877,940; 4,737,614; and 4,296,304 all of which are incorporated herein by reference. These robotic welding systems which are incorporated by reference disclose various positioning techniques that can be used to increase the accuracy of the weld bead position on a workpiece. One or more of these robotic welding positioning systems can be fully or partially utilized in the present invention.

Another more common seam-tracking technique is a through-the-arc technique. In this technique, the robot weaves the wire inside the joint and uses current to detect the center of the joint. Again, this technique is heavily dependent on a consistent wire cast, which may or may not actually exist.

Although many of these positioning systems for robotic welders have provided satisfactory orientation of the welding gun relative to the welding location, these positioning systems do not account for welding wire wobble during a welding process. The welding wire that is being fed through the welding gun is typically fed from a spool, drum or reel. As such, the welding wire has a particular shape or memory as its being fed through a welding gun resulting in the welding wire moving laterally in various positions as its being fed from the end of a welding gun. Such movement of the weld wire results in weld wiggle of the weld bead on a workpiece.

Wire aiming accuracy is very important in robotic welding such as GMAW welding, to ensure proper weld location in a weld joint to obtain desired weld bead quality. In the past, factors such as robotic accuracy, fixture accuracy, part dimensional tolerance and distortion during welding have been for the most part corrected by prior art positioning systems. However, none of these positioning systems have so addressed or successfully addressed wire wobble problems. The wire wobble problem can be significant during the welding process and can be as great as an order of magnitude of the welding wire diameter. In the past, wire straighteners have been used in attempt to alleviate the problem of wire wobble; however, use of wire straighteners have not proven successful in dealing with such problems due to delicate setup and lack of standardization on a factory floor. Wire mechanical properties (e.g., stiffness, cast, pitch, packaging, feedability and delivery (e.g., liner condition, cable curvature)) can all contribute to wire wobble problems.

Several prior techniques have been utilized to account for the wire wobble of the welding wire as it is fed from a welding gun. Once such technique is to measure wire displacement by making multiple long beads on plate welds and observing the weld wiggle as an indication of wire wobble. This method is not proven effective to test large quantities of wire with good repeatability, and furthermore can be very expensive and time consuming. Another technique is to use a video camera with automatic edge detection image processing to record and measure wire wobble as the wire is exiting the weld gun. Although this method of detecting weld wobble has had some success, the video camera has a low frame rate and is adversely affected by lighting thus reducing the effectivity of detection. Laser sensors have also been used to measure wire movement under the contact tip, however, such past systems have been inhibited by the formation of a weld bead on a metal plate and the cost for such arrangements. Other methods of detecting wire wobble have also met with low success such as the use of a plasma arc to deflect the wire by arc force, or the use of induction heating of the weld wire which can be cost prohibitive.

In view of the state of the art with respect to detecting and correcting for wire wobble, there is a need for a wire detection system that quickly and accurately determines the position of a welding wire after the welding wire has been fed through the contact tip of a welding gun.

SUMMARY OF THE INVENTION

The present invention relates to a welding electrode position detection system and more particularly to a welding electrode detection system used in robotic welding to detect the welding wire wobble of a welding wire as it is fed from a welding gun. As can be appreciated, the present invention has broader applications in that it can be used in monitoring the weld wire position in any type of automatic welding system. The present invention is directed particularly to robotic GMAW welding and will be described with specific reference thereto; however, the present invention can be used for other types of welding. There is provided a method and system for determining the inservice placement (lateral movement) of continuous welding wire wherein the method and system include the providing of a supply of a welding wire, feeding of the welding wire by a wire feeder through a conduit which terminates into a welding gun which welding gun includes a tubular contact tip, melting the welding wire with an arc between the welding wire and a nonconsumable electrode serving as a ground return to the power supply, and a sensing arrangement to sense the position of the welding wire as the welding wire exits the contact tip of the welding gun. The present invention contemplates the use of prior robotic control arrangements to control the position of the contact tip of the welding gun with respect to a workpiece to be welded. Examples of such control arrangements are disclosed in the prior art which is incorporated herein by reference.

In one aspect of the present invention, the electrode position detection system includes an electromagnetic wave generator. The electromagnetic wave generator is designed to generate an electromagnetic wave at the welding electrode which is exiting the contact tip of the welding gun. The electromagnetic wave generator can be designed to generate one or more different types of electromagnetic waves such as, but not limited to, visible light, ultraviolet light, infrared light, laser beams, x-rays, microwaves, sound waves, and the like. In one aspect of the invention, the electromagnetic wave is a laser beam. In one specific aspect of this embodiment, the laser beam has a wavelength of about 400–900 nm, typically about 500–800 nm, more typically about 600–700 nm, and still more typically about 670 nm. Typically the laser beam generated by the electromagnetic wave generator has a substantially singular wavelength; however, laser beams having multiple wavelengths can be generated by the electromagnetic wave generator. In another specific aspect of this embodiment, the electromagnetic wave is a structured light pattern projector. Typically the structured light pattern projector generates a patterned formed of a laser line strip; however, other types of light and/or patterns can be used.

In another and/or alternative aspect of the present invention, the electromagnetic wave generator includes or is a scanning laser that emits a line of laser beam and/or a structured light pattern projector. In one embodiment of the invention, the line of laser beam and/or strip of light has a width of about 2–100 mm, typically about 5–50 mm, and more typically about 10–40 mm. Generally the line of the laser beam and/or strip of light has a width which is greater than the diameter of the welding wire, and typically at least about 1½ times the diameter of the welding wire, more typically at least about 2 times the diameter of the welding wire and still more typically at least about 2.5 times the diameter of the welding wire. The selected width of the line of laser beam and/or strip of light is typically great enough such that the welding wire substantially maintains its position within the width of the laser beam line and/or strip of light during the welding process so that the complete wire wobble movement of the welding wire can be ascertained during the welding process. In still another and/or alternative embodiment of the invention, the electromagnetic wave generated by the electromagnetic wave generator is at least partially directed laterally across the welding wire during a welding process. Generally, the electromagnetic wave substantially lies in a lateral plane that is directed at least partially across the welding wire in a welding process. The angle of orientation of the lateral plane of the electromagnetic wave relative to the longitudinal axis of the welding wire and/or the contact tip of the welding gun is generally about 20–90°, typically about 40–90°, and more typically about 45–90°. In one aspect of this embodiment, the lateral plane of the electromagnetic wave is substantially perpendicular (i.e., 90°) to the longitudinal axis of the welding wire and/or the contact tip of the welding gun. The electromagnetic wave is generally directed at the welding wire at a location below the end of the contact tip of the welding wire. Generally, the electromagnetic wave is projected laterally across the welding wire at a location which is at least about 0.01 inch below the end of the contact tip of the welding gun, typically about 0.05 to 2 inches below the end of the contact tip of the welding gun, more typically about 0.1 to 1.8 inches below the contact tip of a welding gun, even more typically about 0.2 to 1.75 inches below the contact tip of the welding gun, and still even more typically about 0.25 to 1.5 inches below the contact tip of the welding gun. The directing of the electromagnetic wave laterally across the welding wire in a position below the end of the contact tip better enables the detection mechanism to monitor the wire wobble of the welding wire as it exits the contact tip of the weld gun.

In still another and/or alternative aspect of the present invention, the electrode position detection system includes a receiver that at least partially receives an electromagnetic wave after such wave has at least partially traveled across the welding wire. Many types of receivers can be used depending on the type or types of electromagnetic wave being generated by the electromagnetic wave generator. One non-limiting receiver that can be used to receive a laser beam from the electromagnetic wave generator is an optical receiver such as, but not limited to, a charge couple device. Generally the optical receiver is oriented to receive a substantial portion of the electromagnetic wave which has been generated by the electromagnetic wave generator and directed laterally across the welding wire. As can be appreciated, the electromagnetic wave that contacts the welding wire as the electromagnetic wave passes laterally across the welding wire path is absorbed and/or deflected, thus is not or substantially not received by the receiver. The absence of this received electromagnetic wave by the receiver is processed to obtain information about one or more parameters of the welding wire.

In yet another and/or alternative aspect of the present invention, the electrode position detection system includes a measuring device designed to determine at least one parameter of the welding wire based upon the electromagnetic wave received by a receiver after the electromagnetic wave has laterally traveled across the welding wire. Non-limiting examples of parameters which can be determined by the measuring device include, but are not limited to, the lateral position of the welding wire, the roundness or ovality of the welding wire, the diameter of the welding wire, welding wire surface profile, welding wire defects, debris on welding wire, the twist of the welding wire, a lateral position history of the welding wire, a roundness or ovality history of the welding wire, a twist history of the welding wire as a function of wire position in the package of welding wire (e.g., wire reel, wire drum, etc.), a diameter history of the welding wire, a lateral movement frequency of the welding wire, a defect history of the welding wire, an outer debris history of the welding wire, a twist frequency of the welding wire, an average length of welding wire per lateral movement cycle, an average length of welding per twist cycle, and/or the amplitude of lateral movement of the welding wire. In essence, the measuring device can provide information concerning the position and/or shape of the welding wire exiting the contact tip of a welding gun, which information can be rapidly used to adjust the position of the welding gun to account for weld wobble and/or provide a historical model of the welding wire during the welding process to allow the welding gun to anticipate adjustments in the position of the welding gun during a welding process. In one embodiment of the invention, the measuring device utilizes fast Fourier transform, discrete Fourier transform, histograms and/or standard deviation techniques (e.g., mean, maximum, minimum, etc.) to ascertain information about the position and/or shape. In one aspect of this embodiment, fast Fourier transform, discrete Fourier transform, histograms and/or standard deviation techniques are used to generate a wire wobble history of the welding wire and to define an average length of welding wire per wobble cycle. As can be appreciated, one or more of these transform techniques can be used to determine other and/or additional parameters of the welding wire. In another and/or alternative embodiment of the invention, the measuring device can include a memory location and/or transfer information to a location for real time use and/or historical purposes: As can be appreciated, the information can be stored in a location near the welder and/or can be transmitted to a remote location via telephone wire, cable, microwave, satellites, etc. In one aspect of this embodiment, a determined parameter by the measuring device is associated with and/or correlated with a particular time, a geographic location (e.g., GPS locator), a particular workpiece, a particular region on the workpiece, one or more welding parameters, and combinations thereof. Such information can be used to ensure weld bead quality and/or provide information to a manufacturer to inspect a weld bead on a workpiece or a particular region of a workpiece for quality control purposes. As can be appreciated, this stored information can be automatically and/or manually monitored in real time and/or at a later time. In still another alternative embodiment of the present invention, one or more of the measured parameters of the welding wire are stored and subsequently mapped to provide welding wire position movement history of the welding wire over a length of time. In one aspect of this embodiment, the measured welding wire position is mapped relative to one or more coordinates. Typically, the center of the welding tip is designated as a 0 coordinate; however, other coordinates can be used. For instance, if a mapping of the weld wire is a two dimensional analysis, the center of the contact tip of the welding wire is designated as 0,0. The position of a welding wire is then subsequently measured relative to its deviation from the center of the welding contact tip. After a sufficient amount of data points are obtained for the welding wire, these points can be mapped on a histogram map to identify on the map high density of points which indicate the most common location of the welding wire. Various visual techniques can be used such as, but not limited to, color to represent higher and lower populated data points to generate a population density plot. These data points can then be used to reposition the welding gun to represent the most common location of the welding wire during a welding process. The history of these data points can also be used to predict or anticipate the movement of the welding wire during the welding process to thereby anticipate the position of the welding wire during a welding process and thereby adjust the position of the welding gun welded to the workpiece as a particular segment of welding wire passes through the contact tip of the welding tip.

In accordance with still yet another and/or alternative aspect of the present invention, the electrode positioned detection system utilizes a plurality of electromagnetic waves for use in determining one or more parameters of the welding wire. The types of electromagnetic waves can be the same or different. In one embodiment of the invention, at least two laser beams are directed laterally across the welding wire to obtain multiple coordinate information of the welding wire during a welding process. In one aspect of this embodiment, the laser beams are substantially positioned in a lateral plane which is oriented at an angle of about 20–90° to the longitudinal axis of the welding wire and/or contact tip, typically about 40–90° to the longitudinal axis of the welding wire and/or contact tip, and more typically about 45–90° to the longitudinal axis of the welding wire and/or welding tip. In another and/or alternative aspect of this embodiment, at least two laser beams are oriented at substantially the same angle with respect to the longitudinal axis of the welding wire and/or contact tip. In still another and/or alternative aspect of this embodiment, at least two laser beams occupy a plane which is non-parallel to one another. In one non-limiting design, the non-parallel angle of the two planes is about 20–90°, and more typically about 45–90°. In one particular arrangement, both planes of the laser beam are oriented about 90° perpendicular to the longitudinal axis of the welding wire and/or contact tip and the two planes of the laser beams are oriented about 90° relative to one another. Multi-dimensional data points of the welding wire can be used to obtain information as to the twist of the welding wire, the roundness or ovality of the welding wire, defects in the welding wire, the amount and/or frequency of occurrence of debris on welding wire, the lateral position of the welding wire in multiple dimensions and/or various other parameters of the welding wire. As can be appreciated, single dimensional data can also be obtained.

In accordance with a further and/or alternative aspect of the present invention, the arc voltage between the welding wire and the non-consumable electrode of the welder is measured to obtain information concerning the position of the welding wire relative to the non-consumable electrode. As the welding wire moves farther from the non-consumable electrode, the arc length between the non-consumable and the welding wire increases resulting in a increase in voltage for a particular current. Furthermore, when the welding wire moves closer to the non-consumable electrode, the arc length resistance between the non-consumable welding electrode and the welding wire decreases thereby resulting in an decrease in voltage for a constant current power source. By monitoring the increase and decrease of voltage during a welding process provides information concerning the relative location of the welding wire during the welding process. In one embodiment of the invention, the arc welding voltage measurement is stored in an effort to obtain historical information concerning the movement of the welding wire during a welding process. This historical information can be used to determine and/or anticipate a movement cycle of the welding wire during a welding process and/or be used to generate quality control data with respect to a weld bead during the welding process. In another and/or alternative embodiment of the invention, multiple non-consumable electrodes are used during the welding process and a switching mechanism is used to activate and deactivate one or more of the non-consumable electrodes to thereby form and terminate an arc between the welding wire and a particular non-consumable electrode. The arc voltage which is generated between at least one of the plurality of non-consumable electrodes and the welding wire can be used to obtain information about the position of the welding wire during a welding process. Typically, the switching mechanism is designed so that there is slight overlap between the disconnecting of one non-consumable electrode and the connecting of another non-consumable electrode so as to prevent inadvertent extinguishing of the arc between the welding wire and one or more of the non-consumable electrodes. In yet another and/or alternative embodiment of the present invention, the monitoring of the arc voltage during a welding process can be used alone or in conjunction with other control or monitoring systems for the welding gun and/or welding wire.

In accordance with yet a further and/or alternative aspect of the present invention, the information obtained about the welding wire can be used to improve the manufacture of welding wire to thereby minimize the wire movement of the welding wire during a welding process. The welding wire detection mechanism can be used to obtain to information about the welding wire during the welding process and to use such information to improve the quality of a weld bead during a welding operation. For instance, the information can be used to design welding with certain wire shape memory and/or to improve wire winding techniques to minimize welding wire movement and/or conduit re-casting by the welding tip and/or other components of the welder. The information can also or alternative be used to obtain relationships between the sensitively of conduit routing geometry (e.g., radii, material, etc.) the wire movement after passing through the conduit.

It is a principal object of the present invention is to provide a detection mechanism and method for determining one or more parameters of a welding wire as the welding wire exits a welding gun.

Another and/or alternative object of the present invention to provide a welding wire detection mechanism that can be used to obtain to information about the welding wire during the welding process and to use such information to improve the quality of a weld bead during a welding operation.

Still another and/or alternative object of the present invention is the provision of a welding wire detection system which can detect one or more parameters of the welding wire by the use of one or more electromagnetic waves directed laterally across the welding wire as it exits a welding gun.

Yet another and/or alternative object of the present invention is the provision of a detection mechanism which utilizes information concerning the arc voltage of the arc between the welding wire and a non-consumable electrode to obtain position information concerning the welding electrode.

A further and/or alternative object of the present invention is the provision of a wire placement mechanism and method which utilizes one or more lasers to obtain information about the welding wire during a welding process.

Still a further and/or alternative object of the present invention is a the provision of a placement mechanism and method which can generate the history for one or more parameters of the welding wire with respect to its position in a package of wire to improve wire winding manufacturing practice.

Yet a further and/or alternative object of the present invention is the provision of a placement mechanism and method which utilizes parameter information of the welding wire to adjust and/or anticipate the position of the welding gun relative to a workpiece during a welding process.

Still yet a further and/or alternative object of the present invention is the provision of a placement mechanism and method which correlates sensitivity of conduit routing geometry and its movement with wire placement in an effort to minimize wire movement.

Another and/or alternative object of the present invention is, the provision of a placement mechanism and method which correlates sensitivity of conduit routing geometry to be used to design wire shape memory and winding techniques that minimize the effect of conduit re-cast.

Still another and/or alternative object of the present invention is the provision of a placement mechanism and method which obtains parameter information concerning the welding wire during a welding process and to provide immediate or subsequent information concerning the quality of the generated weld bead.

These and other objects and advantages will become apparent from the discussion of the distinction between the invention and the prior art and when considering the preferred embodiment as shown in the accompanying drawings.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DETAILED DESCRIPTION OF THE PREFERRED EMBODIMENTS

Figure 1:
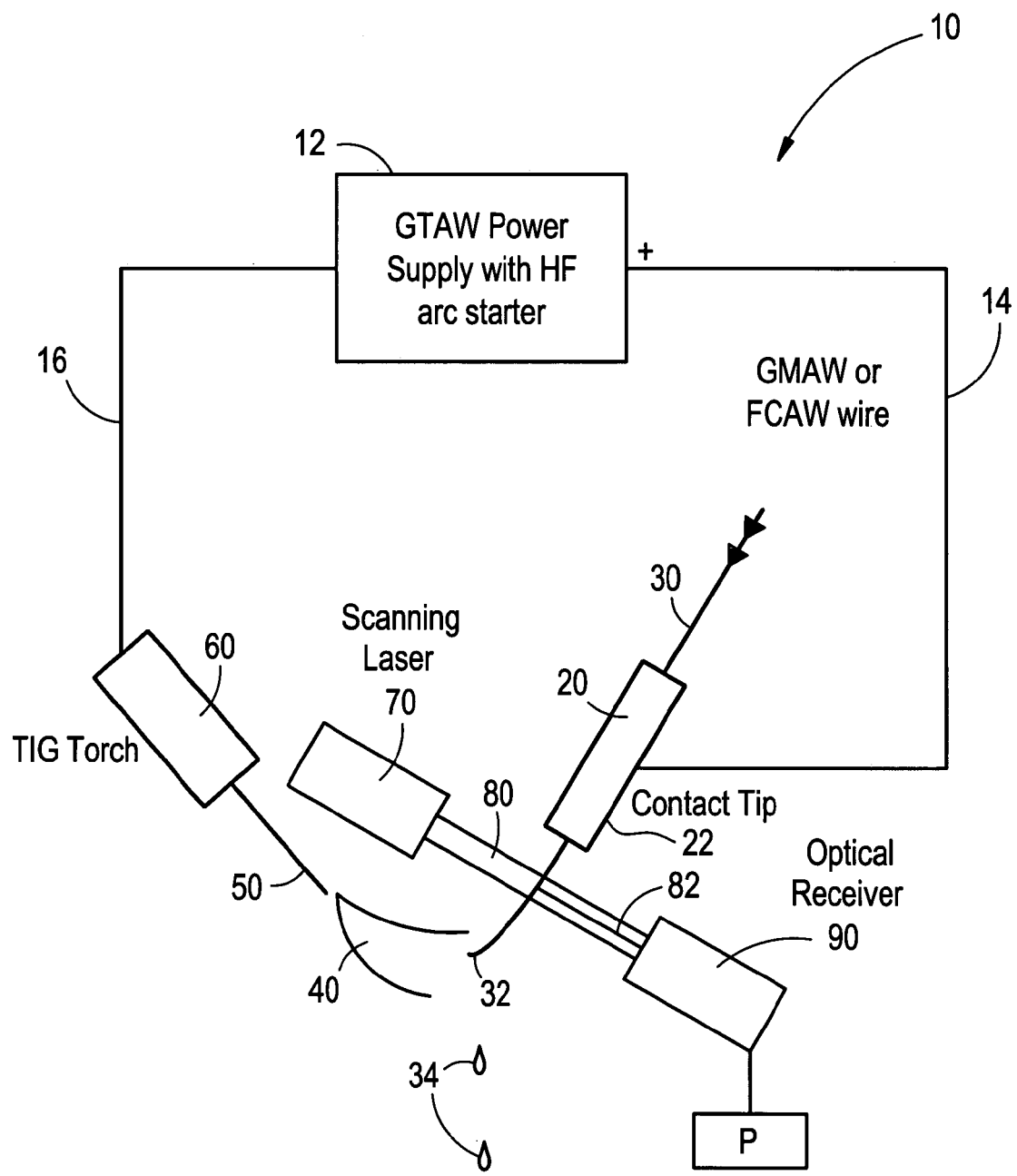
FIG. 1 is a perspective illustration of a welding wire passing through a contact tip of a welding gun and melted by an electric arc and a scanning laser and optical receiver which are used to obtain position and/or other information about the welding wire during the welding process.

Referring now to the drawings wherein the showings are for the purpose of illustrating a preferred embodiment of the invention only and not for the purpose of limiting same, FIG. 1 illustrates a basic arc welding arrangement. The arc welding arrangement includes a gas TIG arc welding (GTAW) power supply with a high frequency (HF) arc starter 12. The operation of a gas TIG arc welder power supply is well known in the art thus no further discussion will be made with respect to such power supply. Examples of power supplies that can be used include, but are not limited to, U.S. Pat. Nos. 5,683,602; 5,338,916; 5,285,042; 4,947,021; and 4,385,223; all of which are incorporated herein by reference. One pole of the GTAW power supply is connected to a contact tip 20 of an arc welding gun by electrical connection 14. A welding wire 30 is illustrated as being fed through the contact tip of the welding gun. The design of the contact tip and the use of a contact tip in a welding gun are well known in the art, thus no further discussion will be made concerning these elements. In robotic welding, the position of the welding gun is typically controlled by a robotic welding arm, not shown. Once again such robotic welding arrangements are well known in the art, thus it will not be further described in the present invention. Welding wire 30 can be a gas metal arc welding wire or a flux cored arc welding wire. If a gas metal arc welding wire (GMAW) is used, typically shielding gas is directed about the welding wire and/or welding pool during the arc welding process. Inert and/or substantially inert gasses and/or gas mixtures such as, but not limited to, helium, argon, helium-argon blend, etc. are commonly used as shielding gases. However, other shielding gases or combinations can be used. Typically the shielding gas, if used, is directed to the weld pool at a rate of about 10–50 CFH; however, other flow rates can be used. When a flux cored arc welding wire (FCAW) wire is used, a shielding gas is typically not necessary since the flux system in the FCAW wire provides shielding during a welding process; however, shielding gas can be used for FCAW wires that do not provide adequate shielding during the welding process. The flux cored wire, metal cored wire or solid wire 30 is typically supplied from a spool, drum or reel, not shown, through a conduit and into the welding gun and finally through the contact tip 20 of the welding gun. The use of welding wire containers such as spools, drums, and/or reels of welding wire are well known in the art, thus will not be discussed in detail. Examples of welding wire containers that can be used in the present invention are disclosed in U.S. Pat. Nos. 6,481,575; 5,931,408; 5,819,934; and 5,549,257; all of which are incorporated herein by reference. The welding wire 30, when in its packaged state, typically develops a shape memory which results in lateral movement of the end 32 of welding wire 30 as the welding wire passes out of end 22 of contact tip 20 of the welding gun. When the GTAW power supply 12 is energized, an arc 40 is formed between end 32 of welding wire 30 and a non-consumable electrode 50 of a TIG torch 60. The non-consumable electrode 50 is typically a tungsten electrode, however other types of non-consumable electrodes can be used. Electric arc 40 heats end 32 of welding wire 30 until the end melts to form molten welding wire 34 which is deposited in a desired weld location on a workpiece, not shown. TIG torch 60 is connected to the negative output of the GTAW power supply 12 by wire 16. Arc 40 is typically started by the use of the high frequency arc starter and is reestablished by the high frequency arc starter if the arc inadvertently extinguishes between non-consumable electrode 50 and end 32 of welding wire 30. Advantages of this electrode consumption method include, but are not limited to, the exertion of minimal force on the welding wire, the close resembling of a MIG application, and the ability to continuously consume large quality of welding wire in an unsupervised environment. The components of the art welding arrangement 10 described above are well known in the art thus further details concerning such an arc welding process will not be further described.

As illustrated in FIG. 1, the contact tip 20 is oriented at an angle of about 45° with respect to a horizontal position of the workpiece, not shown. As can be appreciated, other angles of orientation can be used for the contact tip. A scanning laser 70 directs a scanning laser line 80 toward the welding wire at a position below end 22 of contact tip 20. The laser exerts very little force on the welding wire. Scanning laser line 80 is oriented with respect to the longitudinal axis of the contact tip such that the scanning laser perpendicularly intersects the longitudinal axis of the contact tip. As can be appreciated, orientation of the laser beam relative to the longitudinal axis of the contact tip can be other than a perpendicular orientation. The wavelength of the laser generated by scanning laser 70 has a wavelength of about 600–700 nm and a width of the laser line of about 10–40 mm. As can be appreciated, other wavelengths of the laser can be used and/or other widths of the scanning laser line can be used. As shown in FIG. 1, once scanning laser line 80 laterally travels across welding wire 30, a portion of the laser is absorbed and/or deflected by the welding wire. This deflected portion is illustrated by solid line 82. An optical receiver is diametrically opposed from scanning laser 70 and is oriented so as to receive scanning laser line 80 that has passed laterally crossed welding wire 30. The optical receiver is typically a charge couple device (CCD) array detector; however, other optical receivers can be used. The use of a CCD array detector has the ability to acquire a full spectrum laser light in the time it takes other scanning units to sample a single wavelength. The CCD array detector also typically exhibits high quantum efficiency and relatively low readout noise as compared to conventional photodiode array detectors. As can be appreciated, fiber optic sampling systems can be used. Information received by the optical receiver can be sent to and/or stored in a processing unit P. The received data can be processed by processor P by various techniques such as, but not limited to, fast Fourier transform (FFT), discrete Fourier transform (DFT), histograms, use of standard deviation techniques (e.g., minimum, maximum, mean) and combinations thereof. By using various analytic processes, the processor can determine various parameters of the welding wire during a welding operation, such as, but not limited to, the lateral position of the welding wire at various times during a welding process, the shape (e.g., roundness, ovality, etc.) of the welding wire at various points during the welding process, the thickness (e.g., diameter) of the welding wire at various time during the welding process, the lateral position history of the welding wire, the shape history of the welding wire, the thickness history of the welding wire, the lateral movement frequency of the welding wire, the average length of welding wire per lateral movement cycle, the amplitude of lateral movement of the welding wire, and/or various other attributes of the welding wire during the welding process.

In one example of operation of the invention disclosed in FIG. 1, a GMAW or FCAW wire is fed through contact tip 20 at a rate of approximately 200–1200 inches per minute. A GTAW power supply is selected to have a power output of about 200–800 amps. Welding wire 30 is supplied from a drum of welding wire, not shown. Arc 40 is started between non-consumable electrode 50 and end 32 of welding wire 30 by a high frequency arc starter. As the welding wire is fed through contact tip 20, a scanning laser 60 having a wavelength of about 670 nm and a width of about 20 mm is directed, at a substantially perpendicular angle with respect to the longitudinal axis of the contact tip, toward welding wire 30. The scanning laser line 80 laterally crosses the welding wire at a point of about 0.25–1.5 inches below end 22 of contact tip 20. A CCD optical detector 90 is positioned to receive a laser generated by scanning laser 70. The data received by the CCD optical receiver is transmitted to a processor which uses the data to provide historical information as to wire wobble of a welding wire during a welding process. This historical information is then used by the positioning mechanism of the robotic welder to adjust the position of the contact tip relative to the workpiece thereby reducing the amount of weld bead wiggle in the workpiece due to the wire wobble of the welding wire. The data processed and stored by processor P can also be used to ascertain the weld bead quality of a workpiece during a welding process. Real time information concerning the welding wire can also be used to reduce the amount of weld bead wiggle.

Figure 2:
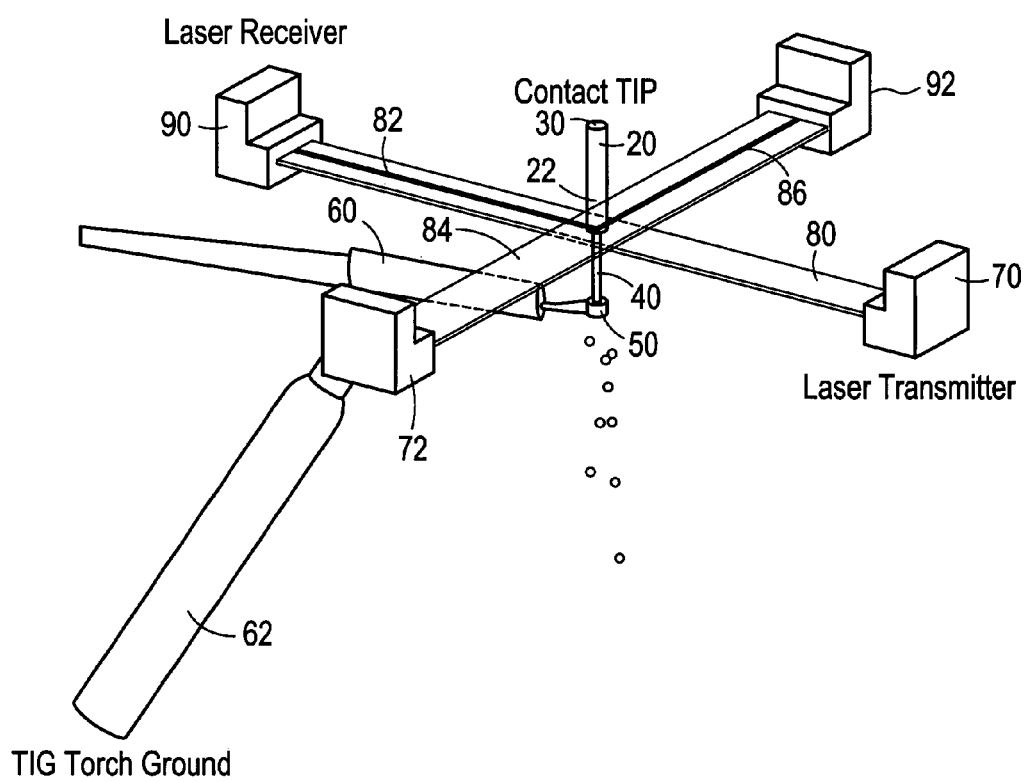
FIG. 2 is a perspective view of an alternative embodiment of the present invention wherein two scanning lasers and two optical receivers are used to obtained multi-dimensional positional and/or other information about the welding wire during a welding process.

Referring now to FIG. 2, a variation to the detection arrangement of the welding wire is illustrated. Similar to the arrangement in FIG. 1, a contact tip 20 is provided having a contact end 22 through which passes a welding wire 30. An electric arc 40 is generated between the end of the welding wire and a non-consumable electrode 50. Non-consumable electrode 50 is connected to TIG torch 60 having a TIG torch ground 62. Two scanning lasers 70 and 72 each generate a scanning laser line 84, respectively. Direct scanning laser lines that laterally pass welding wire 30 at a point of approximately 0.25–1.5 inches below end 22 of contact tip 20. Scanning lasers 70 and 72 both direct the laser light in a plane which is substantially perpendicular to the longitudinal axis of contact tip. Furthermore, the paths of the two lasers are approximately perpendicular to one another. As shown in FIG. 2, as the laser light from the two scanning lasers passes welding wire 30, welding wire 30 deflects and/or absorbs the laser light from the two main lasers as illustrated by lines 82, 86 respectively. An optical receiver 90 is positioned diametrically opposed to scanning laser 70 and an optical laser 92 is positioned diametrically opposed to scanning laser 72. These two optical receivers are designed to receive the laser light that has laterally passed the welding wire and to use such information to provide multi-dimensional information with respect to the welding wire and/or positioning of the welding wire during a welding process. As can be appreciated, the angles of orientation of the laser beams with respect to the longitudinal axis of the contact tip can be the same or different and/or the angle of orientation can be an angle other than 90°. Furthermore, the wavelength of the laser beams and/or the width of the laser line generated by the two scanning lasers can be the same or different. Typically, the wavelengths of the two lasers are different.

Figure 4:
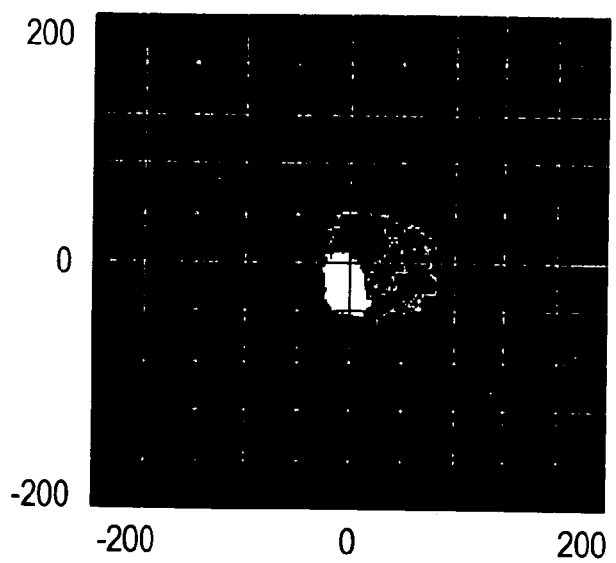
FIGS. 4–6 are histogram maps of three different welding wire sources which information for the histogram map was obtained by the arrangement of FIG. 2.
Figure 5:
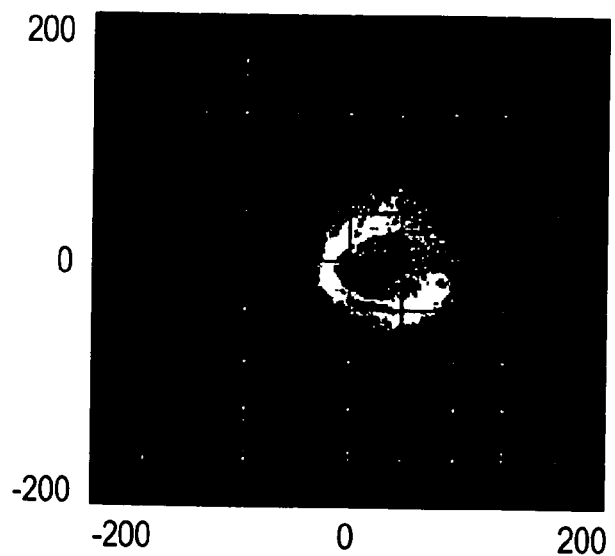
Figure 6:
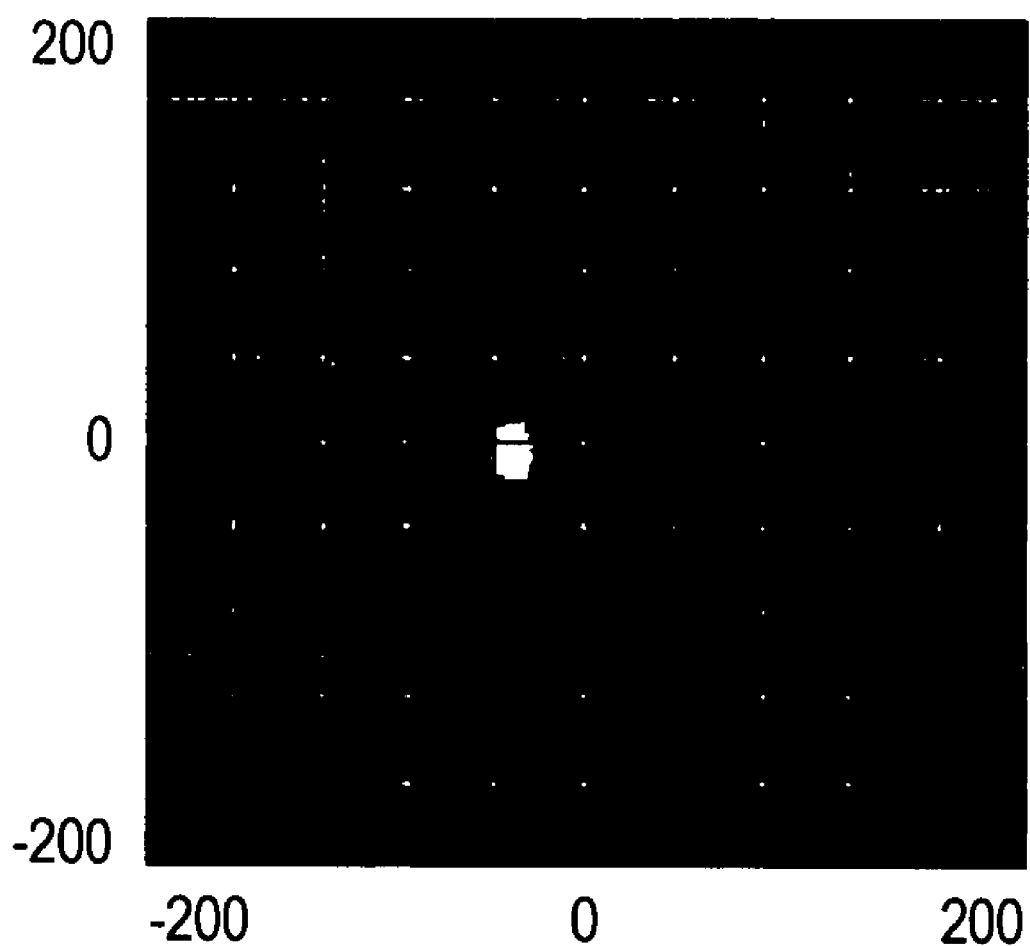

Referring now to FIGS. 4, 5 and 6, the two-dimensional data obtained by the detectors 90, 92 are plotted. FIG. 4 illustrates the wire displacement of the welding wire below the end of the contact tip for a particular type of welding wire. The welding wire was obtained from various commercial sources. FIG. 4 illustrates a two-dimensional histogram map were coordinates 0, 0 is the center of the contact tip. The data used to generate the two-dimensional histogram map was acquired after ten minutes of welding and after approximately 240,000 data pairs were obtained. The wire feed rate for the data illustrated in FIGS. 4 and 6 was approximately 400 inches per minute and was approximately 300 inches per minute for the data illustrated in FIG. 5. Three different types of wire were used to develop the data in FIGS. 4, 5 and 6. A 600 lb reel of welding wire identified as Brand X was used to generate the data in FIG. 4, an 180 lb reel of welding wire identified as Brand Y was used to generate the data in FIG. 5, and a 180 lb box of a welding wire identified as Brand Z was used to generate the data in FIG. 6. The color intensity used in the two-dimensional histogram map represents a histogram count, normalized to point to the highest count (or with the most population). The lighter shades represent a denser data population and the darker shades represent a sparser data population. FIG. 6 illustrates a welding wire that exhibited less wire wobble during welding process. FIGS. 4 and 5 illustrate a welding wire which continues to move during the welding process.

Figure 7:
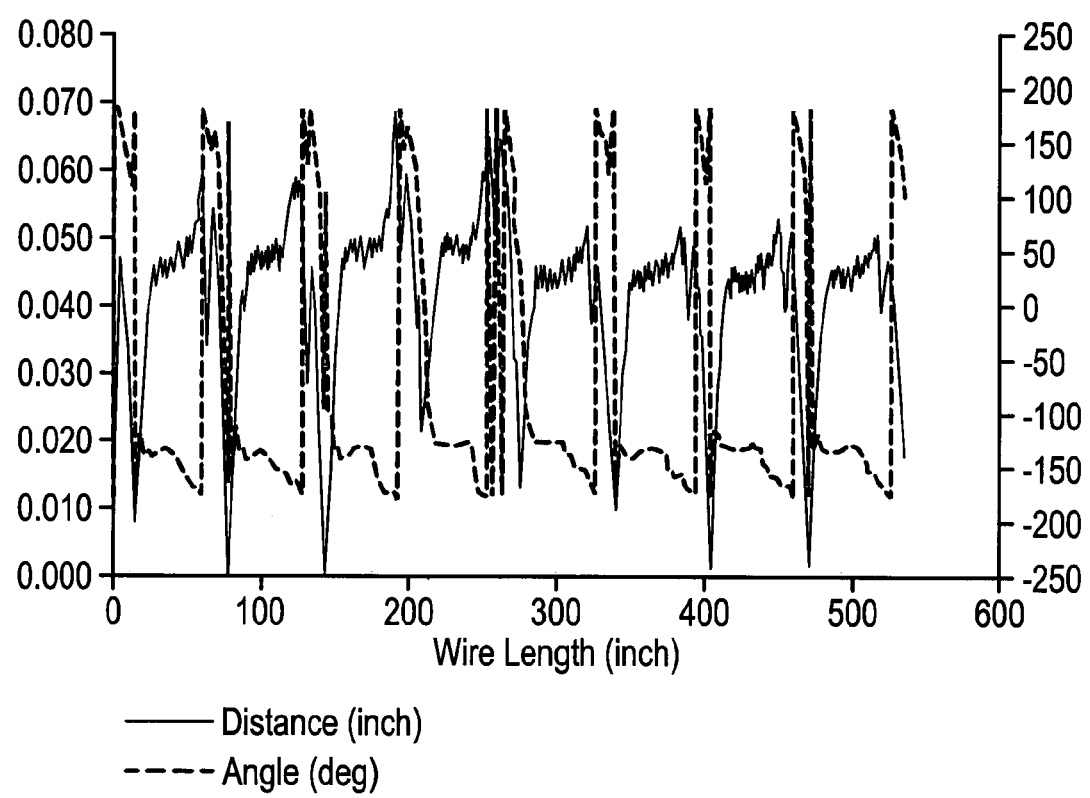
FIG. 7 is a graphical representation of the determined angular orientation of the welding wire and the deviation distance of the welding wire from the center of the contact tip of the welding gun during a welding process using the arrangement of FIG. 2; and, FIG. 8 is a three dimensional graphical representation of the determined angular orientation of the welding wire and the deviation distance of the welding wire from the center of the contact tip of the welding gun during a welding process using the arrangement of FIG. 2.
Figure 8:
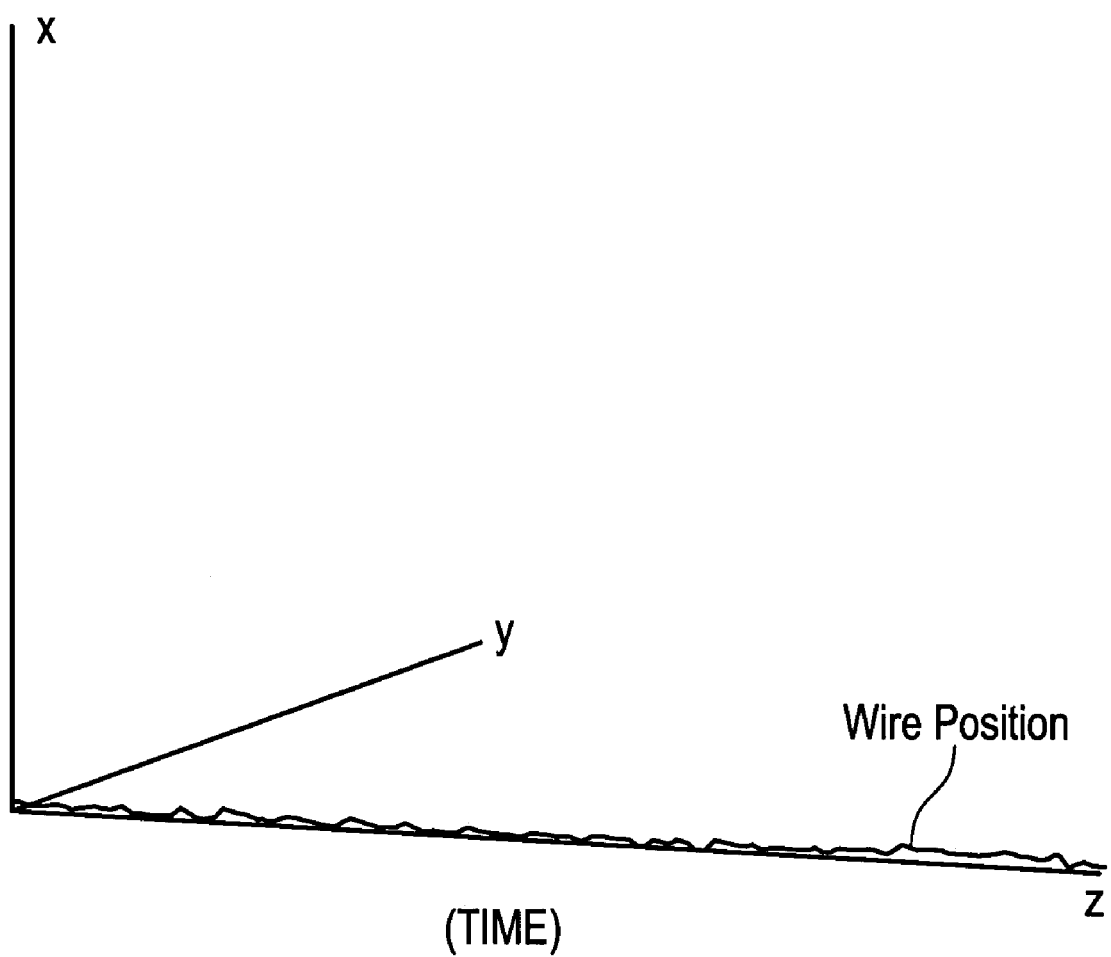

The data used to generate these two-dimensional histogram maps can be manipulated in a variety of manners. For instances, the data used to generate points on the histogram map can be selected to only count hot areas or where the data population exceeds a threshold. This process would disregard low frequency data points and only count the area where the welding wire spends the majority of the time. Other types of data manipulation can include the dividing of the area of applied data points by the wire cross-sectional area, thus normalizing the collected data against the wire size and thereby allow for comparison between various wire sizes. A histogram map can be generated by an aggregate density plot attained from tests at various locations on welding wire in the welding package. This plot changes as the welding wire is obtained from the package at the original full weight and may vary as more and more welding wire is used up from the welding wire package. The data collected can then be used to determine wire placement of welding wire as various amounts of welding wire in the package is used up during the welding process. A histogram map can be generated in Cartesian and in a polar coordinate system to track the movement of the center coordinates at various wire weight levels when the package pays down from full weight to zero weight at fixed weight increments. Alternatively a polar coordinate system (distance from center, angle) can be used to plot the wire position versus time. The distance coordinate from the center corresponds to the wire cast and the angle corresponds to the wire flip. Such a graph is illustrated in FIG. 7. The thinner blue line illustrates the movement of the wire at the center coordinates and the thicker pink dotted line represents the angle of the wire. As illustrated in FIG. 7, the wire angle drastically changes approximately every 75 inches of the wire thus representing a wire flip of approximately every 75 inches which corresponds to the length of welding wire of each loop in a reel. As can be appreciated, as the wire pays further down from the welding wire package, the frequency of the wire flip may increase. As also illustrated in FIG. 7, the deviation of the welding wire from the 0,0 coordinates was the greatest during the flipping of the metal wire. As can be appreciated, this information can useful to minimize the affects of wire wobble thereby improving the weld bead quality during a welding process. FIG. 8 is another way to graphically illustrate the acquired data. FIG. 8 is a three dimensional graph illustrating wire place data along the x, y and z coordinates. The z coordinate is a time coordinate; however, it could alternative be representative of wire length or some other parameter. As can be appreciated, a two dimensional plot and/or plots have more than three dimensions can also or alternatively be generated.

Figure 3:
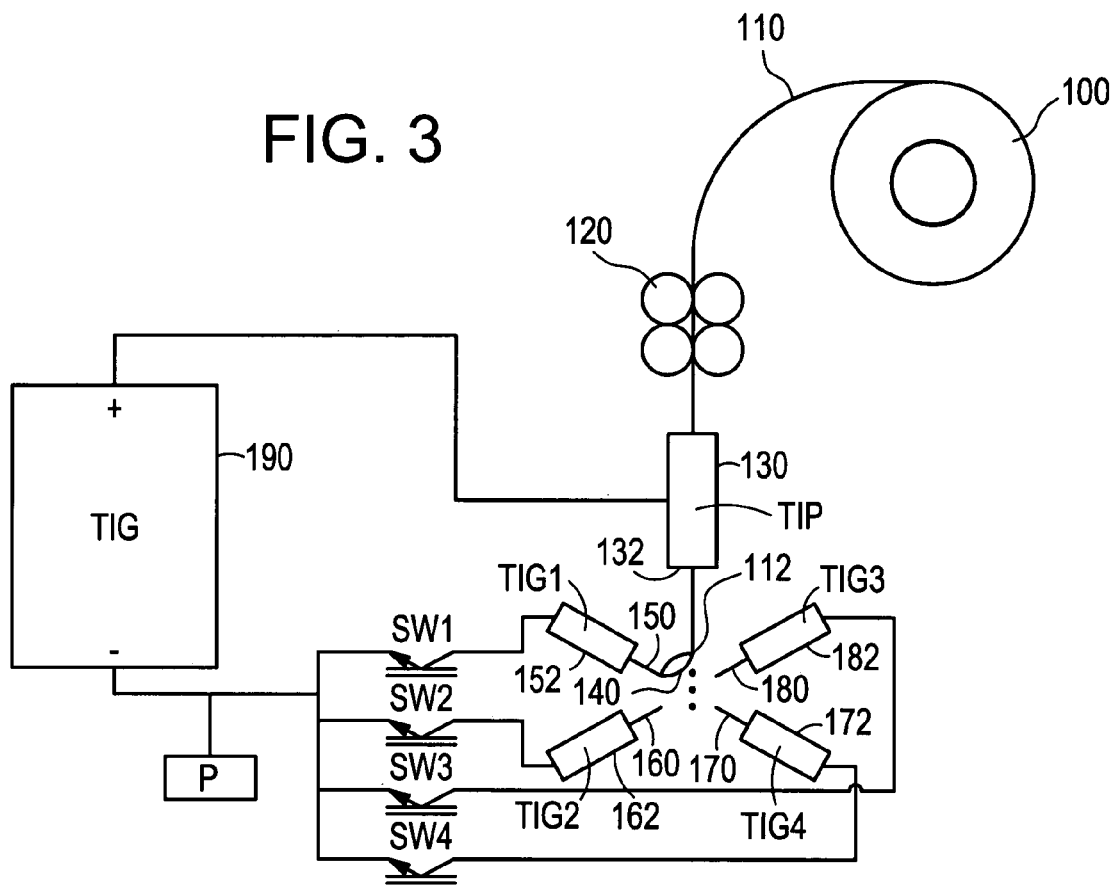
FIG. 3 is a graphical representation of another embodiment of the present invention wherein a switching mechanism controls current through a plurality of non-consumable electrodes and the arc voltage between the welding wire and a particular non-consumable electrode is obtained and used to determine information about the welding wire during a welding process.
Figure 3A:
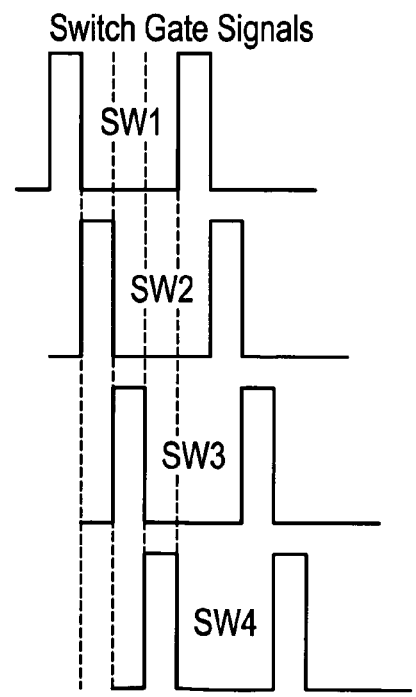
FIG. 3A is a graphical representation of the switching signals to the switches in FIG. 3A which signals are used to activate and deactivate the switches.

Referring now to FIGS. 3 and 3A, another embodiment of the present invention is disclosed. As illustrated in FIG. 3 there is provided a wire reel 100 from which welding wire 110 is unwound therefrom. Welding wire 110 is drawn from wire reel 100 by a wire feeder 120. Wire feeder 120 feeds the welding wire into a contact tip 130. Welding wire exits end 132 of contact tip 130 and the end 112 of welding wire 110 is melted by an arc 140 which is generated between end 112 and at least one non-consumable electrode. As illustrated in FIG. 3, there are provided four TIG torches 152, 162, 172 and 182. Each of the TIG torches include a non-consumable electrode 150, 160, 170, 180 respectively. The power to generate arc 140 is by a GTAW power supply 190. The operation and various features of the arc welding arrangement disclosed in FIG. 3 are similar to the arc welding arrangement disclosed in FIGS. 1 and 2.

As shown in FIG. 3, four TIG torches are positioned below contact tip 130 and are connected to the GTAW power supply by switch one (SW1), switch two (SW2), switch three (SW3), and switch four (SW4). The four switches are controlled by switch gates signals which are illustrated in FIG. 3A. When the switch gate signal is on, the switch closes and allows current to flow through the switch. As illustrated in FIG. 3, a single switch is closed at any given time. The switch control may be arranged such that there is a slight overlap in the opening and closing of a switch so as to prevent the extinguishing of an arc between the non-consumable electrode of the TIG torch and the end of welding wire 112. As shown in FIG. 3A, switch one is first activated, then switch two, then switch three and then switch four and the pattern then repeats back to switch one. As can be appreciated other switching patterns can be used. The position of the end the welding wire 112 is determined by measuring the arc voltage of arc 140. As the arc length increases between non-consumable electrode 150 and end of welding electrode 112, the arc voltage increases. Alternatively, when the arc voltage in the arc decreases as the length of the arc between the non-consumable electrode and the end of the welding wire decreases. By monitoring the arc voltage, a processor P can obtain information as to the movement of the end of the welding wire during a welding process. As can be appreciated, a single TIG torch can be used to measure the arc voltage during an arc welding process such as the arrangements disclosed in FIGS. 1 and 2. The arrangement disclosed in FIG. 3 provides additional information as to the position of the end of the welding wire since multi-dimensional positioning information is obtained by using multiple non-consumable electrodes to generate different arcs at various time periods between a particular non-consumable electrode and the end of the welding wire. Arc voltage welding information can be used in a similar manner as the information that was collected in the arrangements disclosed in FIGS. 1 and 2. For instance, information concerning the lateral position of the welding wire, the twist of the welding wire, the lateral position history of the welding wire, the twist history of the welding wire, the lateral movement frequency of the welding wire, the twist frequency of the welding wire, the average length of welding wire per lateral movement cycle, the average length of welding wire per twist cycle, and/or the amplitude of the lateral movement of the welding wire can be ascertained from the arc voltage data. As can be appreciated, less than four or more than four non-consumable electrodes can be used in combination with the switching arrangement to obtain arc voltage data which can be used to determine information about the welding wire.

The invention has been described with reference to preferred and alternative embodiments. Modifications and alterations will become apparent to those skilled in art upon the reading and understanding of the detailed discussions of the invention provided herein. This invention is intended to include all such modifications and alterations insofar as they come within the scope of the scope of the present invention.

What is claimed is:

1. An electrode detection system for a weld determine at least one parameter of a consumable welding wire after the consumable welding wire is moved through a welding gun during a weld process comprising:
   a welding wire having a width that is feedable through a contact tip of a welding gun;
   a first electromagnetic wave that is at least partially projected and/or scanned laterally across said welding wire at a location at least partially below said contact tip as said welding wire is moving so that said welding wire eclipses at least a portion of said electromagnetic wave as said moving welding wire is fed from said contact tip, said electromagnetic wave projected and/or scanned over a region larger than said width of said welding wire;
   a receiver that at least partially receives said first electromagnetic wave; and,
   a measuring device that determines at least one parameter of said welding wire based on said first electromagnetic wave received by said receiver.

2. The electrode detection system as defined in claim 1, wherein said first electromagnetic wave includes a laser beam.

3. The electrode detection system as defined in claim 2, wherein said laser beam has a wavelength of about 400–900 nm.

4. The electrode detection system as defined in claim 3, wherein said laser beam has a wavelength of about 500–800 nm.

5. The electrode detection system as defined in claim 4, wherein said laser beam has a wavelength of about 600–700 nm.

6. The electrode detection system as defined in claim 5, wherein said laser beam has a wavelength of about 670 nm.

7. The electrode detection system as defined in claim 2, wherein said electromagnetic generator is at least partially formed by a scanning laser that emits a line of laser beam.

8. The electrode detection system as defined in claim 7, wherein said line of laser beam has a width of about 2–100 mm.

9. The electrode detection system as defined in claim 8, wherein said line of laser beam has a width of about 5–50 mm.

10. The electrode detection system as defined in claim 9, wherein said line of laser beam has a width of about 10–40 mm.

11. The electrode detection system as defined in claim 1, wherein said electromagnetic wave substantially lies in a lateral plane, said lateral plane oriented at an angle of about 20–90° to a longitudinal axis of said welding wire of contact tip.

12. The electrode detection system as defined in claim 11, wherein said lateral plane is oriented at an angle of about 40–90° to a longitudinal axis of said welding wire of contact tip.

13. The electrode detection system as defined in claim 12, wherein said lateral plane is oriented at an angle of about 45–90°, to a longitudinal axis of said welding wire of contact tip.

14. The electrode detection system as defined in claim 1, wherein said first electromagnetic wave is projected laterally across said welding wire at least about 0.01 inch below said contact tip.

15. The electrode detection system as defined in claim 14, wherein said first electromagnetic wave is projected laterally across said welding wire about 0.1–2 inch below said contact tip.

16. The electrode detection system as defined in claim 15, wherein said first electromagnetic wave is projected laterally across said welding wire about 0.2–1.75 inches below said contact tip.

17. The electrode detection system as defined in claim 16, wherein said first electromagnetic wave is projected laterally across said welding wire about 0.25–1.5 inches below said contact tip.

18. The electrode detection system as defined in claim 1, wherein said receiver includes an optical receiver.

19. The electrode detection system as defined in claim 18, wherein said optical receiver includes a charge couple device.

20. The electrode detection system as defined in claim 1, wherein said parameter includes a lateral position of said welding wire, roundness or ovality of said welding wire, twist of said welding wire, defects in said welding wire, debris on said welding wire, lateral position history of said welding wire, roundness or ovality history of said welding wire, defect history of said welding wire, debris history of said welding wire, twist history of said welding wire, lateral movement frequency of said welding wire, twist frequency of said welding wire, average length of wire per lateral movement cycle, average length of wire per twist cycle, amplitude of lateral movement of said welding wire, and combinations thereof.

21. The electrode detection system as defined in claim 1, wherein said measuring device utilizes FFT, DFT, histogram, standard deviation and combinations thereof to determine at least one of said parameters of said welding wire.

22. The electrode position detection system as defined in claim 1, wherein at least one of said determined parameters of said welding wire is stored in a memory device.

23. The electrode detection system as defined in claim 22, wherein said stored parameter is correlated to a time, a geographic location, a workpiece, a workpiece region, welding parameter, and combinations thereof.

24. The electrode detection system as defined in claim 1, including a second electromagnetic wave at least partially in a lateral plane that is at least partially projected laterally across said welding wire, said lateral plane of said second electromagnetic wave non-parallel to a lateral plane of said first electromagnetic wave, said receiver at least partially receiving said first and said second electromagnetic wave.

25. A method of determining at least one parameter of a welding wire that passes through a contact tip of a welding gun comprising the steps of:
 a) passing a welding wire having a width through a contact tip of a welding gun;
 b) directing a first electromagnetic wave toward said welding wire such that at least a portion of said first electromagnetic wave is projected and/or scanned laterally across said welding wire at a region on said welding wire that is positioned below said contact tip, said welding eclipsing at least a portion of said first electromagnetic wave as said moving welding wire is fed from said contact tip, said electromagnetic wave projected and/or scanned over a region larger than said width of said welding wire;
 c) receiving at least a portion of said first electromagnetic wave that has passed said welding wire; and,
 d) determining at least one parameter of said welding wire based upon the received portion of said first electromagnetic wave.

26. The method as defined in claim 25, wherein said first electromagnetic wave includes a laser beam.

27. The method as defined in claim 26, wherein said laser beam has a wavelength of about 400–900 nm.

28. The method as defined in claim 27, wherein said laser beam has a wavelength of about 500–800 nm.

29. The method as defined in claim 28, wherein said laser beam has a wavelength of about 600–700 nm.

30. The method as defined in claim 29, wherein said laser beam has a wavelength of about 670 nm.

31. The method as defined in claim 26, including the step of generating a line of said laser beam by a scanning laser.

32. The method as defined in claim 31, wherein said line of said laser beam has a width of about 2–100 mm.

33. The method as defined in claim 32, wherein said line of said laser beam has a width of about 5–50 mm.

34. The method as defined in claim 33, wherein said line of said laser beam has a width of about 10–40 mm.

35. The method as defined in claim 25, including the step of orienting said first electromagnetic wave to at least partially lie in a plane having an angle of about 20–90° to a longitudinal axis of said welding wire or contact tip.

36. The method as defined in claim 35, wherein said plane has an angle of about 40–90° to a longitudinal axis of said welding wire or contact tip.

37. The method as defined in claim 36, wherein said plane has an angle of about 45–90°, to a longitudinal axis of said welding wire or contact tip.

38. The method as defined in claim 25, including the step of orienting said first electromagnetic wave to at least partially lie in a plane at least about 0.01 inch below said contact tip.

39. The method as defined in claim 38, wherein said first electromagnetic wave at least partially lies in a plane about 0.1–2 inches below said contact tip.

40. The method as defined in claim 39, wherein said first electromagnetic wave at least partially lies in a plane about 0.2–1.75 inches below said contact tip.

41. The method as defined in claim 25, wherein said step of receiving includes an optical receiver to at least partially receive said first electromagnetic wave.

42. The method as defined in claim 41, wherein said optical receiver includes a charge couple device.

43. The method as defined in claim 25, wherein said parameter includes a lateral position of said welding wire, roundness or ovality of said welding wire, twist of said welding wire, defects in said welding wire, debris on said welding wire, lateral position history of said welding wire, roundness or ovality history of said welding wire, defect history of said welding wire, debris history of said welding wire, twist history of said welding wire, lateral movement frequency of said welding wire, twist frequency of said welding wire, average length of wire per lateral movement cycle, average length of wire per twist cycle, amplitude of lateral movement of said welding wire, and combinations thereof.

44. The method as defined in claim 25, wherein said step of determining includes a device utilizing FFT, DFT, histogram, standard deviation, and combinations thereof.

45. The method as defined in claim 44, wherein at least one stored determined parameter is correlated to a time, a geographic location, a workpiece, a workpiece region, welding parameters, and combinations thereof.

46. The method as defined in claim 25, including the step of storing a plurality of determined parameters.

47. The method as defined in claim 25, including the step of directing a second electromagnetic wave toward said welding wire such that at least a portion of said second electromagnetic wave is projected laterally across said welding wire at a region on said welding wire that is positioned below said contact tip, said first and second electromagnetic wave substantially lying in non-parallel planes.

* * * * *